US 11,469,797 B2

United States Patent
Baknina et al.

(10) Patent No.: US 11,469,797 B2
(45) Date of Patent: Oct. 11, 2022

(54) RANK INDICATOR (RI) AND CHANNEL QUALITY INDICATOR (CQI) ESTIMATION USING A MULTI-LAYER PERCEPTRON (MLP)

(71) Applicant: Samsung Electronics Co., Ltd., Gyeonggi-do (KR)

(72) Inventors: Abdulrahman Baknina, San Diego, CA (US); HyukJoon Kwon, San Diego, CA (US)

(73) Assignee: Samsung Electronics Co., Ltd

( * ) Notice: Subject to any disclaimer, the term of this patent is extended or adjusted under 35 U.S.C. 154(b) by 154 days.

(21) Appl. No.: 16/906,254

(22) Filed: Jun. 19, 2020

(65) Prior Publication Data
US 2021/0314036 A1    Oct. 7, 2021

Related U.S. Application Data

(60) Provisional application No. 63/004,620, filed on Apr. 3, 2020.

(51) Int. Cl.
| | |
|---|---|
| H04L 12/26 | (2006.01) |
| H04B 7/0456 | (2017.01) |
| H04B 7/06 | (2006.01) |
| H04B 17/336 | (2015.01) |
| G06N 3/08 | (2006.01) |

(Continued)

(52) U.S. Cl.
CPC .......... *H04B 7/0486* (2013.01); *G06N 3/08* (2013.01); *H04B 7/01* (2013.01); *H04B 7/0626* (2013.01); *H04B 7/0632* (2013.01); *H04B 17/336* (2015.01); *H04L 1/203* (2013.01); *H04L 5/0055* (2013.01)

(58) Field of Classification Search
CPC .......... G06N 3/08; H04B 17/336; H04B 7/01; H04B 7/0486; H04B 7/0626; H04B 7/0632; H04L 1/203; H04L 5/0055
See application file for complete search history.

(56) References Cited

U.S. PATENT DOCUMENTS

| | | |
|---|---|---|
| 8,001,063 B2 | 8/2011 | Tesauro et al. |
| 9,357,434 B2 | 5/2016 | Ko et al. |

(Continued)

OTHER PUBLICATIONS

3GPP TS 38.214, "Technical Specification Group Radio Access Network; NR; Physical Layer Procedures for Data (Release 15)," 2018, 77 pages.

(Continued)

*Primary Examiner* — Phuc H Tran
(74) *Attorney, Agent, or Firm* — The Farrell Law Firm, P.C.

(57) ABSTRACT

An apparatus and method are provided for using an MLP algorithm to map channel features to an RI and/or a CQI for CSI feedback. The method includes estimating a channel in the communication network for a signal; extracting at least one channel feature related to the estimated channel; determining RI and CQI pairs; inputting, to an MLP network, the extracted at least one channel feature and the RI and CQI pairs; receiving, for each of the RI and CQI pairs, an output of the MLP network, wherein the outputs of the MLP network indicate throughput or spectral efficiency for the electronic device; and selecting an RI and CQI pair of the RI and CQI pairs based on the received outputs.

20 Claims, 8 Drawing Sheets

(51) Int. Cl.
*H04L 1/20* (2006.01)
*H04B 7/01* (2006.01)
*H04L 5/00* (2006.01)

(56) References Cited

U.S. PATENT DOCUMENTS

| | | |
|---|---|---|
| 9,544,801 B2 | 1/2017 | Han et al. |
| 9,800,393 B2 | 10/2017 | Wei et al. |
| 9,853,786 B2 | 12/2017 | Seo et al. |
| 10,306,508 B2 | 5/2019 | Zhu et al. |
| 10,447,454 B2 | 10/2019 | Kim et al. |
| 2015/0016292 A1 | 1/2015 | Kim et al. |
| 2017/0373743 A1 | 12/2017 | Park et al. |
| 2020/0260465 A1* | 8/2020 | Nammi ............... H04W 72/085 |
| 2021/0143883 A1* | 5/2021 | Yerramalli ............ H04W 24/10 |

OTHER PUBLICATIONS

Wahls et al., "An Outer Loop Link Adaptation for BICM-OFDM that Learns," 2013 IEEE 14th Workshop on Signal Processing Advances in Wireless Communications, 5 pages.

Wahls et al., "Link Adaptation for BICM-OFDM through Adaptive Kernel Regression," IEEE ICASSP 2013, 5 pages.

Duran et al. "Self-optimization Algorithm for Outer Loop Link Adaptation in LTE," IEEE Communications Letters, vol. 19, No. 11, pp. 2005-2008, Nov. 2015, 4 pages.

Aho et al., "CQI Reporting Imperfections and their Consequences in LTE Networks," ICN 2011: The Tenth International Conference on Networks, 5 pages.

Chiumento et al., "Gaussian Process Regression for CSI and Feedback Estimation in LTE," IEEE ICC 2015 Workshop on Smart Communication Protocols & Algorithms, 2015, 6 pages.

Daniels et al., "Adaptation in Convolutionally Coded MIMO-OFDM Wireless Systems through Supervised Learning and SNR Ordering,".

IEEE Transactions on Vehicular Technology, vol. 59, No. 1, pp. 114-126, 2009, 13 pages.

Dong et al., "Machine Learning Based Link Adaptation Method for MIMO System," 2018 IEEE 29th Annual Intl. Symposium on Personal, Indoor and Mobile Radio Comm., 2018, 6 pages.

Li et al., "Link Adaptation in MIMO Systems by Using Machine Learning," Proceedings of the IEEE International Conference on Information and Automation, 2018, 5 pages.

Leite et al., "A Flexible Framework based on Reinforcement Learning for Adaptive Modulation and Coding in OFDM Wireless Systems," in IEEE WCNC, 2012, 6 pages.

Bruno et al., "Robust Adaptive Modulation and Coding (AMC) Selection in LTE Systems using Reinforcement Learning," in IEEE 80th VTC, 2014, 7 pages.

Mota et al., "Adaptive Modulation and Coding based on Reinforcement Learning for 5G Networks," in IEEE GLOBECOM, 2019, 6 pages.

Sutton et al., Reinforcement Learning: An introduction, Chapters 3 and 4, MIT press, 2018, 60 pages.

Watkins et al., "Q-learning," Machine learning, vol. 8, No. 3-4, pp. 279-292, 1992, 14 pages.

Pulliyakode et al., "Reinforcement Learning Techniques for Outer Loop Link Adaptation in 4G/5G Systems," preprint arXiv:1708.00994, 2017, 26 pages.

* cited by examiner

RANK INDICATOR (RI) AND CHANNEL QUALITY INDICATOR (CQI) ESTIMATION USING A MULTI-LAYER PERCEPTRON (MLP)

PRIORITY

This application is based on and claims priority under 35 U.S.C. § 119(e) to a U.S. Provisional Patent Application Ser. No. 63/004,620, which was filed in the United States Patent and Trademark Office on Apr. 3, 2020, the entire content of which is incorporated herein by reference.

FIELD

The present disclosure relates generally to accurate channel state information (CSI) feedback, and more particularly, to an apparatus and method for using a multi-layer perceptron (MLP) algorithm to map channel features to a rank indicator (RI) and/or a channel quality indicator (CQI) for CSI feedback.

BACKGROUND

In order to efficiently utilize available resources and maximize throughput while minimizing a block error rate (BLER), a base station, e.g., a gNodeB (gNB), needs accurate CSI feedback. Conventionally, a table is used to map a channel feature to a candidate CQI and a candidate RI. The table includes a set of thresholds for the channel feature for different CQIs and RIs, and is designed for only one channel, usually an additive white Gaussian noise (AWGN) channel. Therefore, the table must be updated frequently according to the different channel conditions.

While the UE is being used in other channels, the table is being updated to further improve the CQI and RI decisions. Processes for updating the table, however, are often slow and inaccurate, which may result in a significant loss in performance.

Additionally, using multiple tables, i.e., one for each channel, cannot feasibly be done in practice as there are many different channel types.

Accordingly, a need exists for an improved method and apparatus for accurate CSI feedback.

SUMMARY

The disclosure is made to address at least the problems and/or disadvantages described above and to provide at least the advantages described below.

An aspect of the disclosure is to improve the quality of CSI feedback; specifically, RI and/or CQI.

Another aspect of the disclosure is to provide a system and method that utilize an MLP network to map channel features to the RI and/or the CQI. The MLP network can estimate RI, CQI, or both RI and CQI simultaneously.

Another aspect of the disclosure is to utilize reinforcement learning (RL) to train the MLP network.

Another aspect of the disclosure is to provide an online adaptation (OA) algorithm to refine MLP network decisions.

In accordance with an aspect of the disclosure a method is provided for feeding back CSI. The method includes estimating a channel in the communication network for a signal; extracting at least one channel feature related to the estimated channel; determining rank indicator (RI) and channel quality indicator (CQI) pairs; inputting, to a multi-layer perceptron (MLP) network, the extracted at least one channel feature and the RI and CQI pairs; receiving, for each of the RI and CQI pairs, an output of the MLP network, wherein the outputs of the MLP network indicate throughput or spectral efficiency for the electronic device; and selecting an RI and CQI pair of the RI and CQI pairs based on the received outputs.

In accordance with another aspect of the disclosure an apparatus is provided for feeding back CSI. The apparatus includes a transceiver; a multi-layer perceptron (MLP) network; and a processor configured to estimate a channel in the communication network for a signal, extract at least one channel feature related to the estimated channel, determine rank indicator (RI) and channel quality indicator (CQI) pairs, input, to the MLP network, the extracted at least one channel feature and the RI and CQI pairs, receive, for each of the RI and CQI pairs, an output of the MLP network, wherein the outputs of the MLP network indicate throughput or spectral efficiency for the electronic device, and select an RI and CQI pair of the RI and CQI pairs based on the received outputs.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
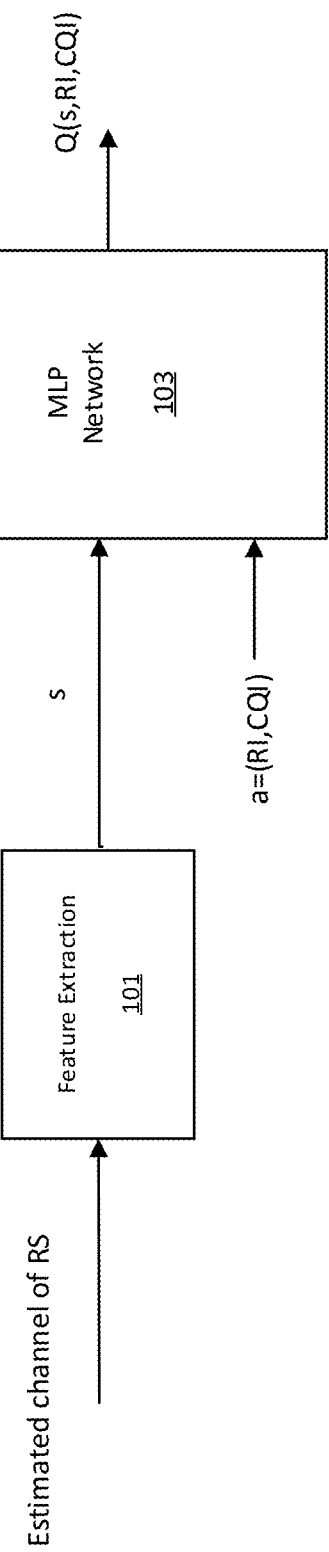
FIG. 1 illustrates a method of calculating a Q-function using a trained MLP network, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to an embodiment may be one of various types of electronic devices. An electronic device may include a portable communication device (e.g., a smart phone), a computer, a portable multimedia device, a portable medical device, a camera, a wearable device, or a home appliance. However, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The disclosure includes using RL to train an MLP network to estimate CQI, RI, or both RI and CQI, collect data samples capturing multiple CSI reporting periods and multiple feedback delays, choosing a set of features for accurate CSI estimation under multiple channel conditions and multiple system configurations in terms of number of antennas, reference signal (RS) ports, . . . , etc., and modifying the collected data samples in order to train the network to choose RI and/or CQI that maximizes the spectral efficiency only or maximizes the spectral efficiency along with satisfying another constraint, such as the BLER constraint.

The disclosure also describes network selection criteria among the networks trained with different random seeds because an MLP network trained to minimize the mean square error (MSE) may not guarantee sufficient performance in terms of throughout or BLER.

The disclosure provides an OA algorithm to tune the MLP network decisions in an online fashion, which is utilized when the MLP network is deployed in an actual system. The OA algorithm will adjust network decisions if it encounters channels in practice that were not observed in the training phase. The decisions of the network may be updated based on the current channel conditions and the decoding success/failure probability. The disclosed OA algorithm can also be used to control the BLER of different RIs and/or CQIs.

In an existing approach, a UE uses a table to map one of the channel features to a candidate CQI and a candidate RI. The table includes a set of thresholds for the channel feature for different CQIs and RIs. The table is usually designed based on the simple AWGN channel. While the UE is being used in other channels, the table is updated to further improve the CQI and RI decisions.

The disclosed algorithm, however, provides a better mapping from the current channel conditions to RI and CQI than traditional algorithms. The algorithm can handle many channel features at once, unlike the conventional methods which cannot map many features at once.

Using an algorithm according to an embodiment of the disclosure, there is no requirement to update thresholds stored in a table, as there is no table, like in conventional methods.

Using the algorithm also allows for further tuning the MLP network decisions based on the failure or success of the decoding. Additionally, other characteristics, such as BLER, can be easily controlled by using the OA algorithm.

FIG. 1 illustrates a method of calculating a Q-function from a trained MLP network, according to an embodiment.

Referring to FIG. 1, at least one feature 's' is extracted from an estimated channel of an RS in step 101. These features are then fed to an MLP network, which estimates the expected throughput (or spectral efficiency) for all the different values of (RI,CQI) combinations in step 103. The MLP network represents a function from the inputs (features and (RI,CQI)) to the expected throughput. This function is referred to as a Q-function.

More specifically, different values of (RI,CQI), which represent RI and CQI estimates, are input the MLP network to generate different outputs Q, where Q is an estimate of expected throughput (or spectral efficiency) that is made based on the input features and the input (RI,CQI) estimates. The MLP network's determination of Q can model the expected throughput for a gNB's allocation of resources based on the input channel features and the input RI, CQI estimates.

The system selects the (RI,CQI) with the largest value for the Q-function, which is the best (RI,CQI) estimate (e.g., the best output of the MLP network) for the given input channel features. Accordingly, the MLP network will output a highest Q when using the most accurate RI and CQI estimates (i.e., the RI and CQI estimates that best reflect the state of the channel).

Figure 2:
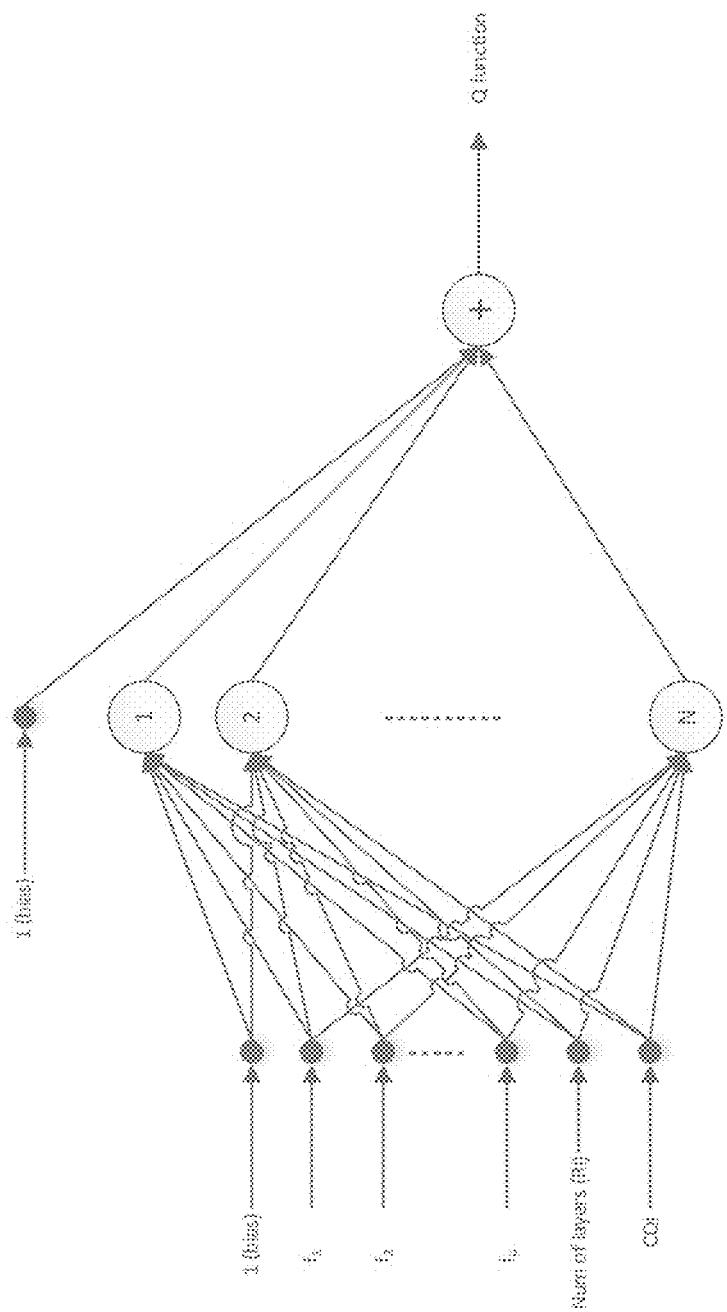
FIG. 2 illustrates an MLP network, according to an embodiment.

FIG. 2 illustrates an MLP network, according to an embodiment. Specifically, FIG. 2 illustrates the MLP network being used as a regression estimator.

Referring to FIG. 2, the MLP network includes P input features in addition to the RI and CQI. The MLP network also has one hidden layer with N nodes in it. The MLP network has only one input node that outputs the estimated spectral efficiency. The trained MLP network will have proper weights between each of the edges illustrated in FIG. 2. The nodes usually have non-linear functions.

The MLP network may also be realized in different ways. The MLP network may use multiple hidden layers, instead of one, or may use an MLP with more outputs while reducing the inputs.

Additionally, the MLP network can eliminate the CQI from the MLP input and calculate the Q-function for CQI={1,,CQI_max} simultaneously at the output. Similarly, the system can eliminate RI instead of CQI, or can do the same for both RI and CQI simultaneously.

Figure 3:
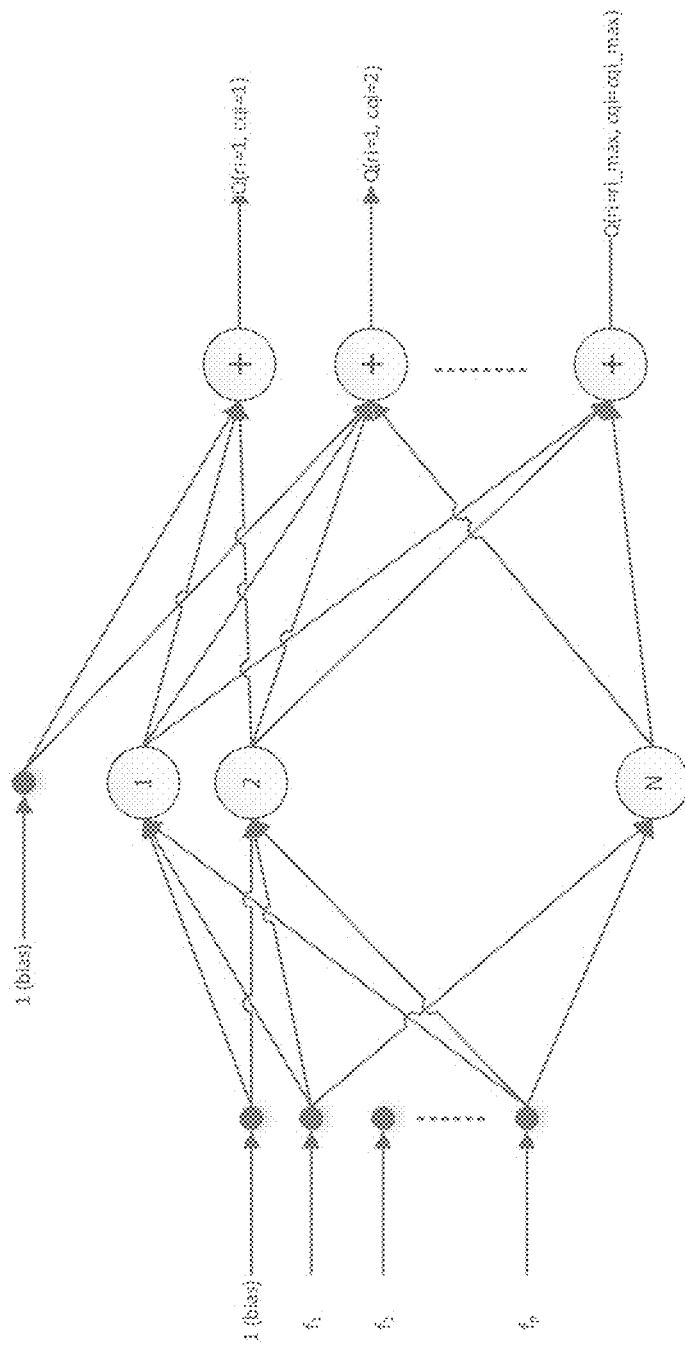
FIG. 3 illustrates an MLP network, according to an embodiment.

FIG. 3 illustrates an MLP network, according to an embodiment. Specifically, FIG. 3 illustrates the CQI and the RI being eliminated from the MLP input and the Q-function being calculated for CQI={1,,CQI_max} and RI={1,,RI_max} simultaneously at the output.

There may be some advantages for one network over the other. For example, the network illustrated in FIG. 2 may have smaller number of nodes, while the network illustrated in FIG. 3 computes all the outputs in parallel at the same time.

The system trains the MLP network offline, e.g., using an RL approach. The system may gather as much sufficient experience as possible from different states, actions, and the corresponding spectral efficiency and then use the gathered experience to train the MLP network. For example, using RL, the MLP network is trained from the previous experience which is gathered offline.

Figure 4:
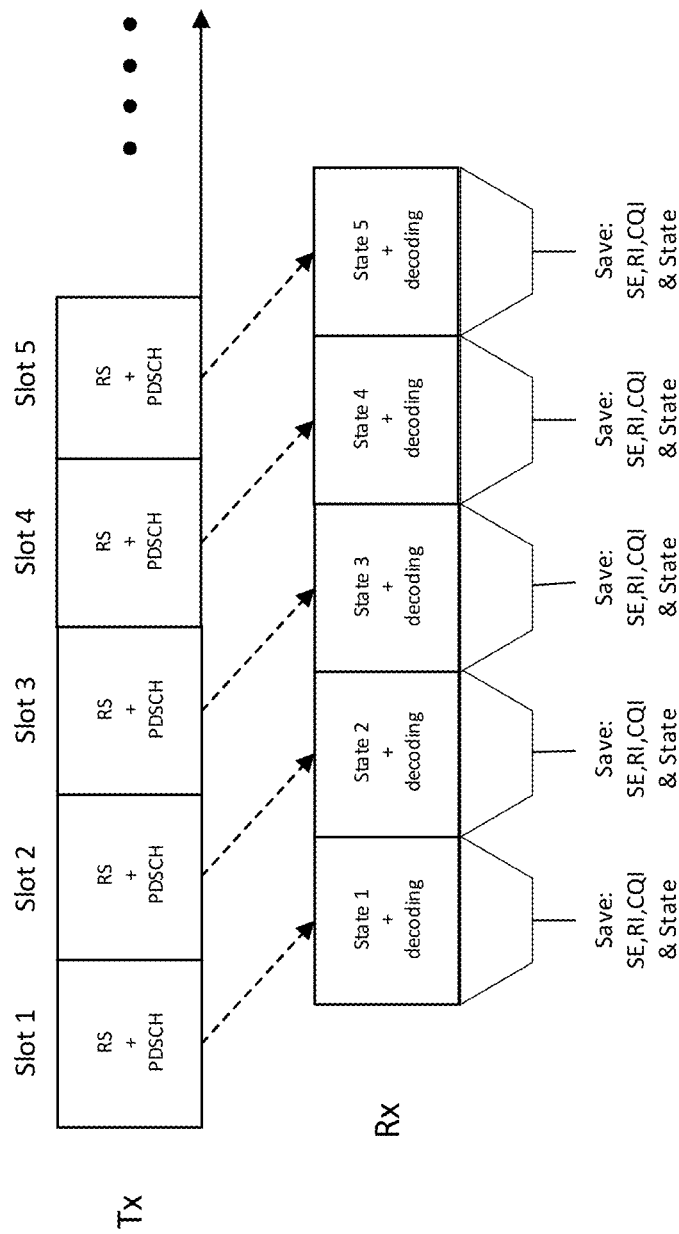
FIG. 4 illustrates a method of data collection for MLP training, according to an embodiment.

FIG. 4 illustrates a method of data collection for MLP training, according to an embodiment.

Referring to FIG. 4, the experience can be gathered for 5 different channel states. For each different state, the system saves a spectral efficiency (SE) an RI, a CQI, and a state identifier. The SE is the number of bits successfully received at the UE on a certain channel.

The system may order the states with the corresponding reward for different feedback delays and RS periods.

Figure 5:
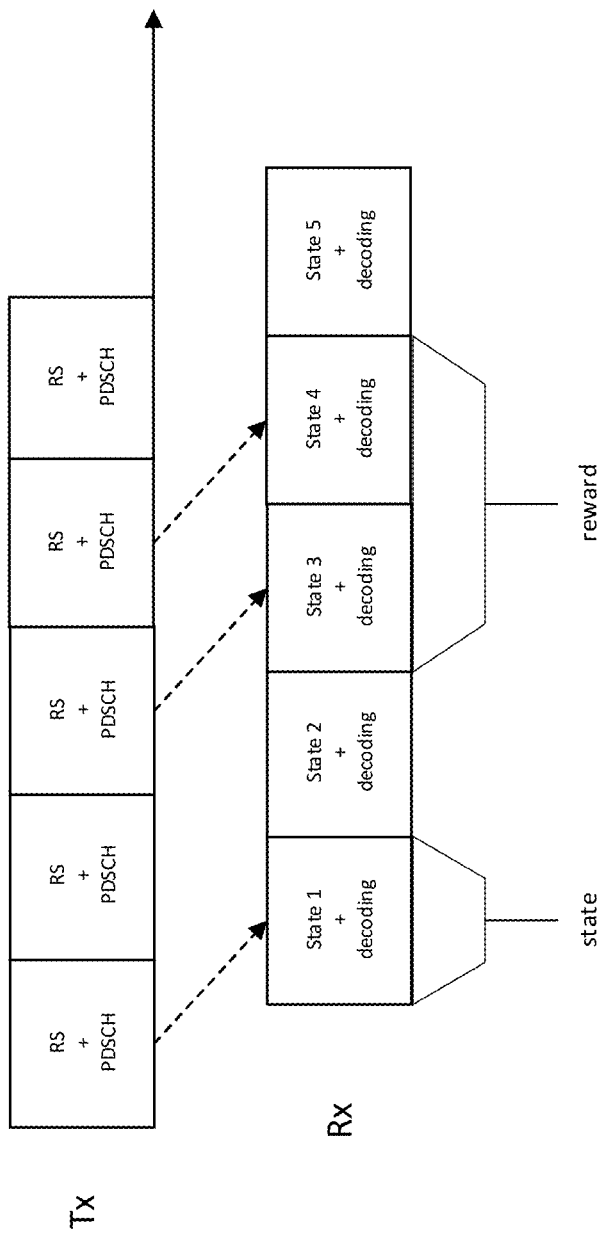
FIG. 5 illustrates a method of ordering states with a corresponding reward for different feedback delays and RS periods, according to an embodiment.

FIG. 5 illustrates a method of ordering states with a corresponding reward for different feedback delays and RS periods, according to an embodiment.

Referring to FIG. 5, the system orders states with a corresponding reward for a feedback delay and RS period of 2. That is, the data generation for feedback delay=2 and RS period=2.

The data collection for different states (different channels, different signal-to-noise ratios (SNRs), different numbers of layers, different antenna configurations, etc.) may be performed and the received SE (or throughput) may be recorded. The network is may train offline using the collected experience. For example, the training can be done for 2 cases: an unconstrained case and constrained case.

Unconstrained Case: A basic case in which the system will maximize an objective (e.g., throughput or spectral efficiency). For each slot, the reward at slot t (which is the experience) can represented using Equation (1).

$$r(s_t, RI_t, CQI_t) = SE(s_t, RI_t, CQI_t) \quad (1)$$

Constrained Case: If the system has an additional constraint on performance, e.g., BLER, the system should maximize the expected spectral efficiency, and should also satisfy a BLER constraint. The system may modify the reward for each sample to have some additional term corresponding to the BLER as shown in Equation (2):

$$r(s_t, RI_t, CQI_t) = SE(s_t, RI_t, CQI_t) - \mu_{i,k}(e_t(i) - P_{e,th}) \quad (2)$$

In Equation (2), $SE(s_t, RI_t, CQI_t)$ is the SE when state $s_t$ is observed while $RI_t, CQI_t$ is used, $P_{e,th}$ is the error threshold defined for BLER, $e_t(i)$ is the resulting BLER from using the MLP network, and $\mu_{i,k}$ is a factor to weight (control) the BLER constraint. $\mu_{i,k}$ is initialized to a number greater than zero, $\mu_{i,0}$. Equation (2) can be updated as shown in Equation (3):

$$\mu_{i,k+1} = \mu_{i,k} + \alpha(\mathbb{E}[e(i)] - P_{e,th}) \quad (3)$$

In Equation (3), a is selected such that $\mu_{i,k+1} > 0$.

Feature Extraction

Features used by the system for the MLP may be divided into 2 parts. The first part may be obtained from the estimated channel of the RS. The second part may be directly obtained from the system parameters and the operation mode. The system introduces features that can be estimated from the estimated channel of the RS. In general, there are many features which can be extracted from the channel of the RS. However, not all features are relevant to the CQI/RI estimation.

The set of features extracted system from the estimated channel may include the following:

(1) Average SNR observed across different resource elements (REs), which may be calculated using Equation (4):

$$SNR = \frac{1}{\# \ RS \ \text{layers}} \frac{1}{N_{RE}} \sum_{K=0}^{N_{RE}-1} \text{trace}\left(\frac{E_s}{\sigma^2}(H_k W)^H H_k W\right) \quad (4)$$

In Equation (4), W is a candidate pre-coder matrix decided by a precoding matrix indicator (PMI) selection algorithm or any other algorithm and $H_k$ is a channel estimation of an RS at a $k^{th}$ RE. The SNR estimate is used to indicate an operating point. For high SNR, higher modulation coding schemes (MCSs) (and equivalently higher CQIs) are allocated, while in lower SNRs, lower MCSs (and equivalently lower CQIs) are usually allocated. Similarly, RI increases in proportion to SNR.

(2) Estimated delay spread of the channel. The delay spread controls how much inter-symbol interference (ISI) (if any) exists in a channel. For some channels with high ISI, higher RIs and CQIs cannot be used.

(3) Estimated Doppler frequency. The Doppler frequency represents how fast the channel changes over time. The Doppler frequency is used when estimating CQI because there is a delay between an instance of estimating the CQI and the instance it will be used. The Doppler frequency will help estimate how different the channel is expected to be at a later time and, therefore, feedback a suitable CQI and/or RI.

There are also other features that may be used for an accurate CSI estimation. These features are not extracted from the channel but can be obtained from the system configuration. The features extracted from the system parameters may include:

(1) Number of ports of the RS. This changes the distribution of the effective SNR as observed at the receiver. As the number of ports increase, better concentration of the distribution around a mean value is expected.

(2) Number of UE Receive antennas. This changes the distribution of the effective SNR as observed at the receiver. As the number of ports increase, better concentration of the distribution around a mean value is expected.

(3) CSI reporting period. This represents how often the transmitter can change its MCS/Rank based on the reported RI/CQI. If the CSI reporting period is too long, then it is expected that the UE should report only the average CSI metrics (RI and/or CQI). However, if the CSI is very frequent, then the UE will improve the throughput by reporting instantaneous CSI metrics.

(4) Feedback Delay. This represents how outdated the CSI will be when it reaches the transmitter. If the delay of the CSI reporting to the transmitter is relatively long, then it is expected that the UE should report only the average CSI metrics (RI and/or CQI). However, if the CSI arrives to the transmitter with very little delay, then the UE will improve the throughput if it reports the instantaneous CSI metrics.

Network Training, Selection, and Range

Training the MLP network may include using different loss functions. An example using the MSE is shown in Equation (5) below.

$$L(\theta) = \frac{1}{M}\sum_{t=1}^{M} |r(s_t, RI_t, CQI_t) - Q(RI_t, CQI_t, \theta)|^2 \quad (5)$$

In Equation (5), M is the number of collected samples.

However, the system cannot rely on the MSE metric, $L(\theta)$, when choosing the MLP network. There is a problem in that this metric may not directly reflect the true performance of this MLP network. Hence, the system trains many MLP networks, each with a different random seed. Thereafter, MLP networks may be deployed in an actual system and then the one with the best performance may be chosen. This performance can be quantified in many ways. For example, some metrics may include:

(1) Highest throughput: This can be measured for a $j^{th}$ MLP network using Equation (6).

$$MSE_{Tput}(j) = \frac{1}{\#SNRs * \#channels}\sum_{i \in SNRs, channels} |Tput_i^{ideal} - Tput_i^{MLP}(j)|^2 \quad (6)$$

In Equation (6), $Tput_i^{ideal}$ is the baseline threshold, e.g., obtained using an exhaustive search algorithm, and $Tput_i^{MLP}(j)$ is the throughput resulting from $j^{th}$ MLP network. The ideal throughput can be any reference curve, or the throughput obtained from exhaustive search.

(2) Most consistent in terms of RI and/or CQI decisions, i.e., the MLP network which does not change the reported RI and/or CQI often. This metric is important as the network devices (especially, the UE) does not want to change the RI and/or CQI very frequently. An example for quantifying the amount of RI reporting change for the $j^{th}$ MLP network is given by Equation (7).

$$\Delta RI_{avg}(j) = \frac{1}{\#SNRs * \#channels * \#timeslots}\sum_{i \in SNR, channels}\sum_{n \in time\ slots} |\Delta RI_{i,n}(j)| \quad (7)$$

The system may also use a combination between two or more metrics as shown in Equation (8).

$$j^* = \arg\min MSE_{Tput}(j) + \alpha \Delta RI_{avg}(j) \quad (8)$$

In Equation (8), a can be chosen with different values to adjust weight between MSE of throughput and the amount of RI change for the network. $j^*$ is an optimal network for use in actual deployment.

Once the MLP network is properly trained, the system will have a Q-function as given in Equation (9).

$$Q^*(s, RI, CQI, \theta^*) = \mathbb{E}[SE(s, RI, CQI)] \quad (9)$$

The (RI,CQI) can then be chosen using Equation (10).

$$(RI^*(s), CQI(s)) = \arg\max_{(RI, CQI)} Q^*(s, RI, CQI) \forall s \in \mathbb{S} \quad (10)$$

In practice, argmax can be calculated as shown in Table 1. Specifically, Table 1 shows an algorithm applied to calculate an argmax of a Q-function.

TABLE 1

Q_max = −100
CQI_max = [ ];
RI_max = [ ];
For RI={1,2,3,...,ri_max}
  Calculate the features
  for CQI={1,2,3,...,cqi_max}
    obtain Q_new = Q(s, RI, CQI)
    if Q_new > Q_max
      Q_max = Q_new;
      CQI_max = CQI;
      RI_max = RI;
    End if
  End for
End for
Report (RI_max,CQI_max)

Reducing the Complexity of the Algorithm

The system may search a subset of possible RIs and CQIs. For example, one approach could be saving previously reported RI and CQI and then in a next reporting instant, calculate only the Q-function around the previously reported RI and CQI, such as:

RI, RI+/−x, where x can be any integer within the RI range.

CQI,CQI+/−y, where y can be any integer within the CQI range.

In general, x and y may be chosen depending on a practical setting, but 1 or 2 will likely be sufficient for most cases.

In addition to the reduced search, the system can further reduce the computation complexity by using additional memory for the implementation.

TABLE 2

Initialize a lower and higher threshold for BLER (denoted as $BLER_{th\_L}$ and $BLER_{th\_H}$)
while {CQI feedback requested}
1. obtain Pack(RI,CQI) from PDSCH transmissions
2. obtain the Q function using the already trained MLP network
3. Calculate the weighting $W_{ack,th}$ (RI, CQI) as follows:
    if $P_{ack}$ (RI, CQI) ≥ $BLER_{th\_L}$
        $W_{ack,th}$ (RI, CQI) = $P_{ack}$ (RI, CQI)
    else
        $W_{ack,th}$ (RI, CQI) = 0
    end if
4. weight the Q function with $W_{ack,th}$ (RI, CQI)
5. choose (RI*,CQI*) based on Q(RI, CQI) * $W_{ack,th}$ (RI, CQI) according to
    (RI*,CQI*) = $\mathrm{argmax}_{RI \in \{1,...,4\} CQI \in \{1,2,...,15\}}$ Q(RI, CQI) * $W_{ack,th}$ (RI, CQI)
6. If $P_{ack}$ (RI*, CQI*) ≥ $BLER_{th\_H}$, we reset our previous experience for higher RIs
and
CQIs as follows:
    if $P_{ack}$ (RI*, CQI*) ≥ $BLER_{th\_H}$
        $P_{ack}$ (RI*, CQI* + 1) = 1
            $P_{ack}$ (RI* + 1,1:CQI*) = 1
    end if
end while FIG. 6 illustrates an MLP network with reduced complexity, according to an embodiment.

Figure 6:
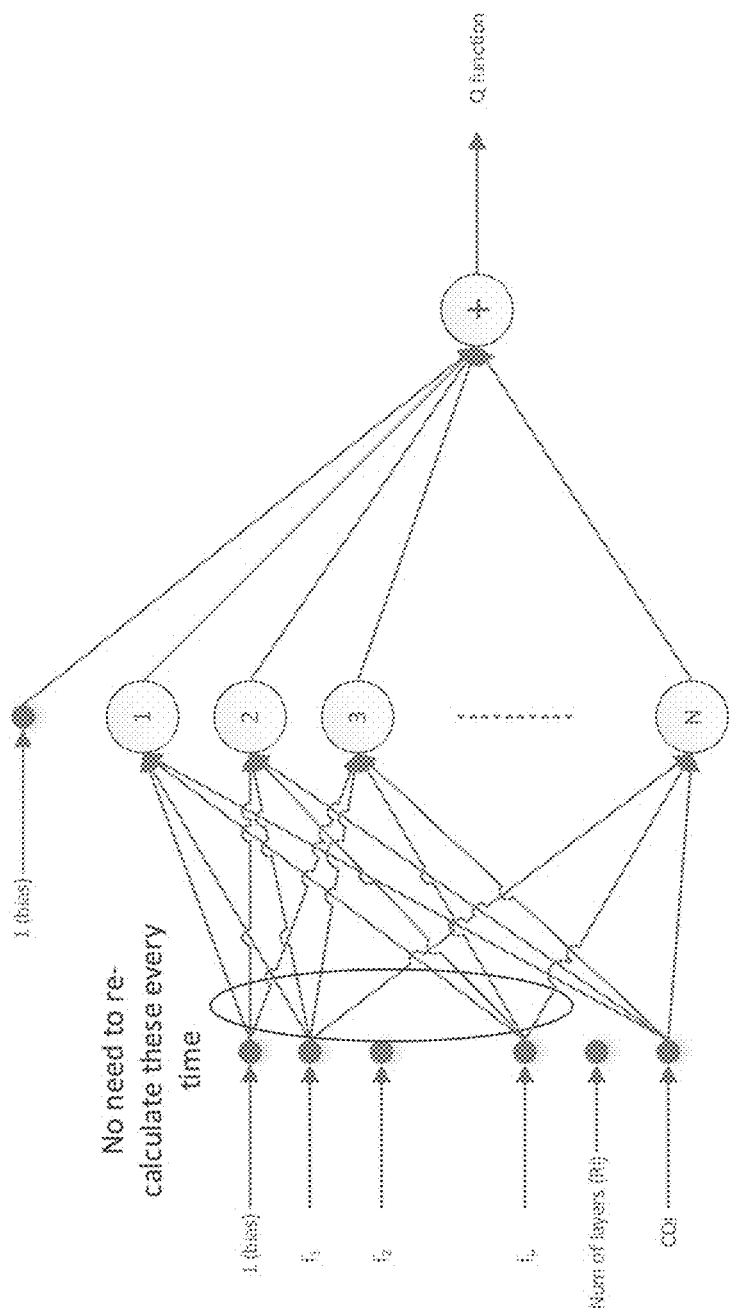
FIG. 6 illustrates an MLP network with reduced complexity, according to an embodiment.

Referring to FIG. 6, while looping on different RI/CQIs, the first P inputs almost never change. Also, for the same RI, the system should try 2y+1 different CQI values, such that the input to RI also does not change very frequently and, therefore, may not need to be calculated every time. For each RI, the system may calculate the output from the first 5 inputs once and then only update the output from the last input node in each of the 4 consecutive iterations. This will be repeated 2x+1 times as the system searches over 2x+1 different RIs.

Online Adaptation of the Trained MLP Network

In order to refine the MLP network decision based on channel behavior, the system may apply a weight the output of the MLP network (i.e., the Q-function). The weight may be a function of the estimated probability of an acknowledgement (ACK).

Figure 7:
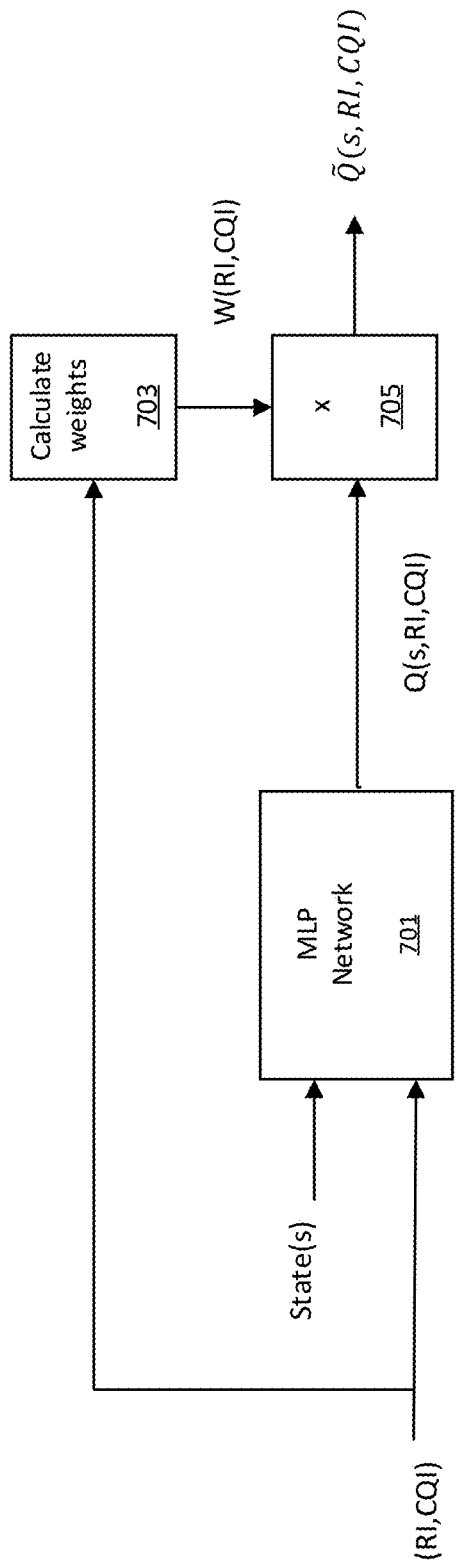
FIG. 7 illustrates a method of weighting a Q-function, according to an embodiment.

FIG. 7 illustrates a method of weighting a Q-function, according to an embodiment.

Referring to FIG. 7, similar to FIG. 1, at least one feature is extracted from an estimated channel of an RS and are then fed to an MLP network, which estimates the expected throughput (or spectral efficiency) for all the different values of (RI,CQI) combinations in step 701. The MLP network represents a function from the inputs (features and (RI,CQI)) to the expected throughput. This function is referred to as a Q-function. The system selects the (RI,CQI) with the largest value for the Q-function.

Additionally, weights are calculated for the estimated channel of the RS in step 703. These weights are then applied to the Q-function in step 705.

An optimal (RI,CQI) can be calculated using Equation (11) below.

$$(RI^*(s), CQI^*(s)) = \arg\max_{(RI,CQI)} Q^*(s, RI, CQI) * W(RI, CQI) \forall s \in \mathbb{S} \quad (11)$$

In Equation (11), W (RI,CQI) is a function of (RI,CQI) in order to weight the Q-function resulting from different RIs and CQIs. The W(RI,CQI) can be adjusted to control the allowable BLER, e.g., using an algorithm as shown in Table 2 below.

Step 6 in Table 2 may be used to reset the estimated BLER when the channel conditions improve (e.g., SNR increases). Step 3 weights the Q-value of the (RI,CQI) with estimated BLER probability being above a threshold. Otherwise, the system will replace the weight by zero, which results in eliminating the (RI,CQI) from being chosen by the algorithm.

Figure 8:
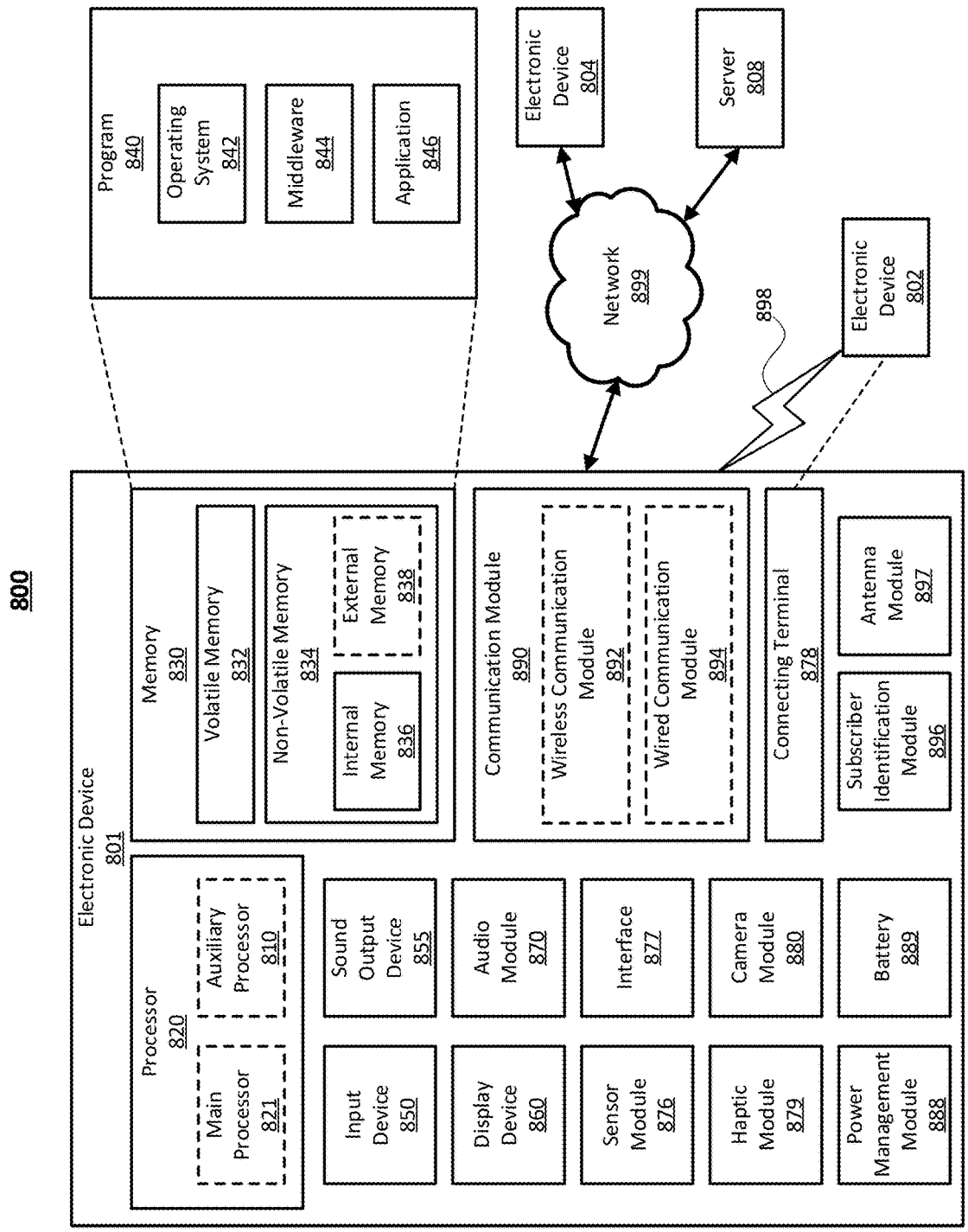
FIG. 8 illustrates a block diagram of an electronic device in a network environment, according to an embodiment.

FIG. 8 illustrates a block diagram of an electronic device 801 in a network environment 1100, according to one embodiment.

Referring to FIG. 8, the electronic device 801 in the network environment 800 may communicate with another electronic device 802 via a first network 898 (e.g., a short-range wireless communication network), or another electronic device 804 or a server 808 via a second network 899 (e.g., a long-range wireless communication network). The electronic device 801 may also communicate with the electronic device 804 via the server 808. The electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In one embodiment, at least one (e.g., the display device 860 or the camera module 880) of the components may be omitted from the electronic device 801, or one or more other components may be added to the electronic device 801. In one embodiment, some of the components may be implemented as a single integrated circuit (IC). For example, the sensor module 876 (e.g., a fingerprint sensor, an iris sensor, or an illuminance sensor) may be embedded in the display device 860 (e.g., a display).

The processor 820 may execute, for example, software (e.g., a program 840) to control at least one other component (e.g., a hardware or a software component) of the electronic device 801 coupled with the processor 820, and may perform various data processing or computations. As at least part of the data processing or computations, the processor 820 may load a command or data received from another component (e.g., the sensor module 876 or the communication module 890) in volatile memory 832, process the command or the data stored in the volatile memory 832, and store resulting data in non-volatile memory 834. The processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or execute a particular function. The auxiliary processor 823 may be implemented as being separate from, or a part of, the main processor 821.

The auxiliary processor 823 may control at least some of the functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to one embodiment, the auxiliary processor 823 (e.g., an ISP or a CP) may be implemented as part of another component (e.g., the camera module 880 or the communication module 890) functionally related to the auxiliary processor 823.

The memory 830 may store various data used by at least one component (e.g., the processor 1120 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by another component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to one embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to one embodiment, the audio module 870 may obtain the sound via the input device 850, or output the sound via the sound output device 855 or a headphone of an external electronic device 802 directly (e.g., wired) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. The sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device 802 directly (e.g., wired) or wirelessly. According to one embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device 802. According to one embodiment, the connecting terminal 878 may include, for example, an HDMI connector, a USB connector, an SD card connector, or an audio connector (e.g., a headphone connector).

The haptic module 879 may convert an electrical signal into a mechanical stimulus (e.g., a vibration or a movement) or an electrical stimulus which may be recognized by a user via tactile sensation or kinesthetic sensation. According to one embodiment, the haptic module 879 may include, for example, a motor, a piezoelectric element, or an electrical stimulator.

The camera module 880 may capture a still image or moving images. According to one embodiment, the camera module 880 may include one or more lenses, image sensors, ISPs, or flashes.

The power management module 888 may manage power supplied to the electronic device 801. The power management module 888 may be implemented as at least part of, for example, a power management integrated circuit (PMIC).

The battery 889 may supply power to at least one component of the electronic device 801. According to one embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more CPs that are operable independently from the processor 820 (e.g., the AP) and supports a direct (e.g., wired) communication or a wireless communication.

According to an embodiment, the communication module 890 may include an MLP network as described above.

According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or a standard of the Infrared Data Association (IrDA)) or the second network 899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to one embodiment, the antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. All or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

One embodiment may be implemented as software (e.g., the program 840) including one or more instructions that are stored in a storage medium (e.g., internal memory 836 or external memory 838) that is readable by a machine (e.g., the electronic device 801). For example, a processor of the electronic device 801 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

According to the above-described embodiments, a system and method are provided, which utilize an MLP network to map channel features to the RI and/or the CQI. The algorithm may estimate RI, CQI, or both RI and CQI simultaneously. The algorithm can map many channel features at the same time to the corresponding RI and/or CQI. With more features, the mapping to the RI and/or the CQI will be more precise. Conventionally, mapping many features to the RI and/or the CQI is not possible in table-based methods due to the complexity of generating these tables.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method performed by an electronic device in a communication network, the method comprising:
   estimating a channel in the communication network for a signal;
   extracting at least one channel feature related to the estimated channel;

determining rank indicator (RT) and channel quality indicator (CQI) combinations;

inputting, to a multi-layer perceptron (MLP network, the extracted at least one channel feature and the RI and CQI combinations;

receiving, for each of the RI and CQI combinations, an output of the MLP network, wherein the outputs of the MIT network indicate throughput or spectral efficiency for the electronic device; and selecting an RI and CQI combination of the RI and CQI combinations based on the received outputs.

2. The method of claim 1, wherein selecting the RI and CQI combination of the RI and CQI combinations based on the received outputs comprises selecting an RI and CQI combination of the RI and CQI combinations corresponding to a best output of the received outputs.

3. The method of claim 1, further comprising receiving an indication of resources based on the selected RI and CQI combination.

4. The method of claim 3, further comprising transmitting the signal using the indicated resources.

5. The method of claim 3, further comprising processing the signal using the indicated resources.

6. The method of claim 1, further comprising:
calculating weights for the estimated channel; and
applying the weights to the received outputs, prior to selecting the RI and CQI combination of the RI and CQI combinations corresponding to the best output of the received outputs.

7. The method of claim 6, wherein the weights include a function of an estimated probability of an acknowledgement (ACK).

8. The method of claim 6, wherein the RI and CQI combination of the RI and CQI combinations are selected using:

$$(RI^*(s), CQI^*(s)) = \arg\max_{(RI,CQI)} Q^*(s, RI, CQI) * W(RI, CQI) \forall\, s \in \mathbb{S},$$

where $Q^*(s,RI,CQI)$ is an estimated Q-function from the MLP network when a state s is observed and RI,CQI is used and $W(RI,CQI)$ is a function of RI and CQI to weight a resulting Q-function and modify the MLP network decision if a predetermined condition is met.

9. The method of claim 8, further comprising controlling a block error rate (BLER) by adjusting $W(RI,CQI)$.

10. The method of claim 1, wherein the MLP network is modeled offline using at least one of an unconstrained case for maximizing throughput or a constrained case in consideration of an additional constraint on performance.

11. The method of claim 10, wherein the additional constraint on performance includes a block error rate (BLER) constraint.

12. The method of claim 1, wherein the MLP network is trained offline using at least one of an unconstrained case for maximizing throughput or unconstrained case in consideration of an additional constraint on performance.

13. The method of claim 1, wherein the at least one channel feature related to the estimated channel includes at least one of an average signal-to-noise ratio (SNR), an estimated delay spread, and an estimated Doppler frequency.

14. The method of claim 1, wherein the outputs of the MLP network are based on at least one of a number of ports for the signal, a number of receive antennas, a channel state information (CSI) reporting period, and a feedback delay.

15. The method of claim 1, wherein the RI and CQI combinations are included in a subset of RI and CQI combinations selected from all possible RI and CQI combinations.

16. An electronic device for use in a communication network, the electronic device comprising:
a transceiver;
a multi-layer perceptron (MLP) network; and
a processor configured to:
estimate a channel in the communication network for a signal,
extract at least one channel feature related to the estimated channel,
determine rank indicator (RI) and channel quality indicator (CQI) combinations,
input, to the MLP network, the extracted at least one channel feature and the RI and CQI combinations,
receive, for each of the RI and CQI combinations, an output of the MLP network, wherein the outputs of the MU' network indicate throughput or spectral efficiency for the electronic device, and
select an RI and CQI combination of the RI and CQI combinations based on the received outputs.

17. The electronic device of claim 16, wherein processor is further configured to selecting an RI and CQI combination of the RI and CQI combinations corresponding to a best output of the received outputs.

18. The electronic device of claim 16, wherein the processor is further configured to transmit, via the transceiver, the signal using resources that are indicated to the electronic device based on the selected RI and CQI combination.

19. The electronic device of claim 16, wherein the processor is further configured to process the signal using resources that are indicated to the electronic device based on the selected RI and CQI combination.

20. The electronic device of claim 16, wherein the processor is further configured to:
calculate weights for the estimated channel, and
apply the weights to the received outputs, prior to selecting the RI and CQI combination of the RI and CQI combinations corresponding to the best output of the received outputs.

* * * * *